US009251842B1

(12) United States Patent
Ehlen

(10) Patent No.: US 9,251,842 B1
(45) Date of Patent: Feb. 2, 2016

(54) DIGITAL OPTICAL DISC MAGAZINE

(71) Applicant: Facebook, Inc., Menlo Park, CA (US)

(72) Inventor: Jon Brian Ehlen, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/608,536

(22) Filed: Jan. 29, 2015

(51) Int. Cl.
  *G11B 17/22* (2006.01)
  *G11B 17/028* (2006.01)
  *G11B 15/68* (2006.01)
  *G11B 23/03* (2006.01)
  *G11B 33/04* (2006.01)

(52) U.S. Cl.
  CPC .......... *G11B 17/225* (2013.01); *G11B 15/6825* (2013.01); *G11B 17/028* (2013.01); *G11B 23/0323* (2013.01); *G11B 33/0461* (2013.01); *G11B 15/6835* (2013.01)

(58) Field of Classification Search
  CPC ............. G11B 23/0323; G11B 17/225; G11B 15/6825; G11B 15/6835; G11B 17/028; G11B 17/0282; G11B 17/22; G11B 27/11; G11B 27/002; G11B 27/34; G11B 27/36; G11B 33/0422; G11B 33/0461

USPC .......... 369/30.52, 30.53, 30.36, 30.85, 30.88, 369/30.42; 720/615, 613, 614, 725, 617; 711/114

See application file for complete search history.

(56) References Cited

U.S. PATENT DOCUMENTS

| 7,673,309 | B2 * | 3/2010 | Douglass et al. | 720/721 |
|---|---|---|---|---|
| 7,954,118 | B2 * | 5/2011 | Douglass et al. | 720/621 |
| 8,276,170 | B2 * | 9/2012 | Douglass et al. | 720/617 |
| 8,516,513 | B2 * | 8/2013 | Son et al. | 720/725 |

* cited by examiner

*Primary Examiner* — Ali Neyzari
(74) *Attorney, Agent, or Firm* — Perkins Coie LLP

(57) ABSTRACT

Technology is provided for digital optical disc magazines. The disc magazine includes a cabinet, at least one disc drive positioned within the cabinet, and a plurality of drawers disposed in the cabinet. A plurality of disc trays are disposed in the plurality of drawers and each disc tray includes a plurality of disc locations. A bi-directional disc pusher is supported on a gantry between adjacent drawers and is positionable along the adjacent drawers proximate a selected target disc location corresponding to one of the plurality of disc locations. A robotic gripper is positionable adjacent the target disc location and operative to grip a disc pushed at least partially from the target disc location by the disc pusher and to transport the disc to the disc drive.

18 Claims, 8 Drawing Sheets

DIGITAL OPTICAL DISC MAGAZINE

TECHNICAL FIELD

This patent application is directed to data disc storage configurations and, more specifically, to a disc magazine for providing high-density storage of digital optical discs.

BACKGROUND

Existing digital optical disc storage systems usually include 10 to 12 discs in a cartridge. Typically, the system cycles through each disc in the cartridge to find the disc of interest. Accordingly, existing storage systems are inefficient and have limited capacity for a given rack space.

BRIEF DESCRIPTION OF THE DRAWINGS

The high-density disc magazines introduced here may be better understood by referring to the following Detailed Description in conjunction with the accompanying drawings, in which like reference numerals indicate identical or functionally similar elements.

Figure 1:
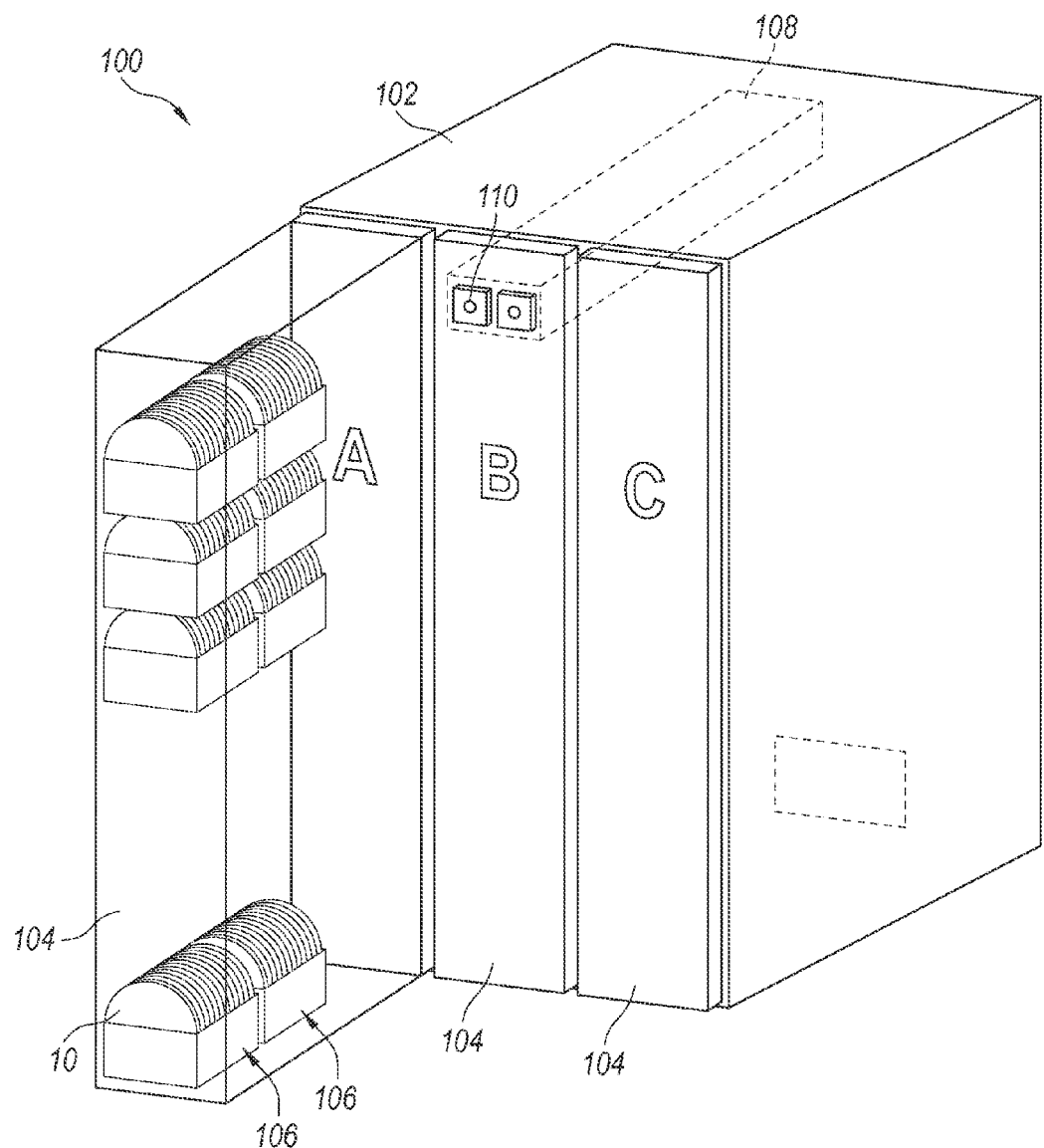
FIG. 1 is a perspective view illustrating a disc magazine according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A disc magazine is disclosed for providing high-density storage of digital optical discs. In some embodiments, the magazine includes a sealed cabinet containing several vertical drawers. Each drawer in turn houses multiple trays. In some embodiments, each of the trays can hold approximately 200 Blu-ray or other discs, e.g., digital video discs, compact discs, or indeed any other type of discs. The cabinet can also contain at least one bi-directional disc pusher supported on a gantry between adjacent drawers. The disc pusher pushes a selected target disc from its corresponding tray. Once the disc is pushed at least partially from the tray, a robotic gripper grasps the disc and places it into a disc drive. The robotic gripper can also remove the disc from the disc drive and return it to its original location. The robotic gripper includes elastomeric fingers that move radially with respect to the disc to grasp the disc by its edges. In some embodiments, the gripper also includes an axially extending hub grip to facilitate lifting discs from a horizontal drive. In some embodiments, the disc pusher and/or the gripper include machine vision to identify the target disc.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a disc magazine 100 according to a representative embodiment. Disc magazine 100 includes a cabinet 102 that houses a plurality of drawers 104. The drawers of the illustrated embodiment are vertically oriented drawers 104. Each drawer 104 contains a plurality of disc trays 106 positionable in known or detectable locations in the drawer. Each disc tray 106 can contain a plurality of discs 10. For example and without limitation, each disc tray 106 can contain 200 or more discs oriented in coaxial alignment. Although the various embodiments described herein are described with respect to digital optical discs, other suitable discs may be housed in magazine 100 in accordance with the disclosed technology. Disc magazine 100 may also include a disc drive bay 108 that houses one or more disc drives configured to removeably receive and read the discs. Cabinet 102 may also include one or more filtered fan assemblies 110 to cool the contents within the cabinet 102, such as the disc magazine 100, the disc drives, and other equipment therein. The term "magazine" is used herein as a container (e.g., a cabinet) for housing multiple items (e.g., discs) that is configured to feed the items into a subsequent process or device (e.g., disc drive).

Figure 2:
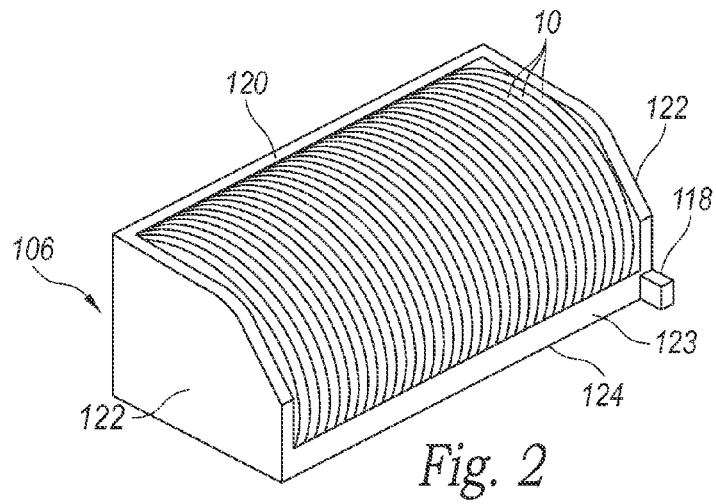
FIG. 2 is a perspective view of a disc tray as shown in FIG. 1.
Figure 3:
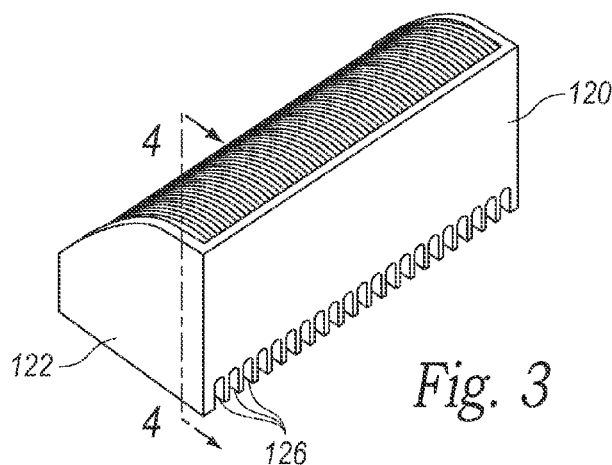
FIG. 3 is a perspective view of the disc tray shown in FIGS. 1 and 2 as viewed from the back side.
Figure 4:
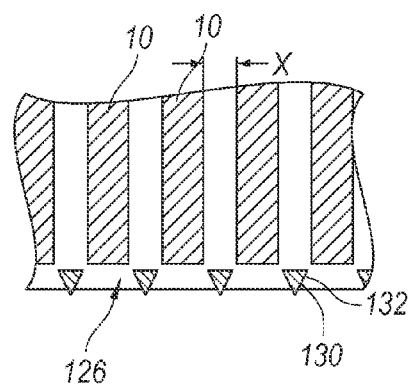
FIG. 4 is a partial cross-section taken about line 4-4 in FIG. 3.

FIG. 2 illustrates disc tray 106 that includes a back wall 120, end walls 122, bottom wall 124, and short front wall 123. Disc tray 106 is open on one side and on the top to facilitate insertion and removal of discs 10 from the disc tray 106 during operation of the magazine. Disc tray 106 can include a datum flag 118 to facilitate indexing the location of the disc tray within the disc drawer 104. In some embodiments, the datum flag 118 is used as a reference for a disc sensor as described more fully below. With further reference to FIG. 3, disc tray 106 includes a plurality of disc locations or positions each of which accommodates a disc 10. Access apertures 126 are formed through the disc tray 106 where back wall 120 meets bottom wall 124. Referring to FIG. 4, each access aperture 126 corresponds to a disc location that may contain an associated disc 10.

Figure 5:
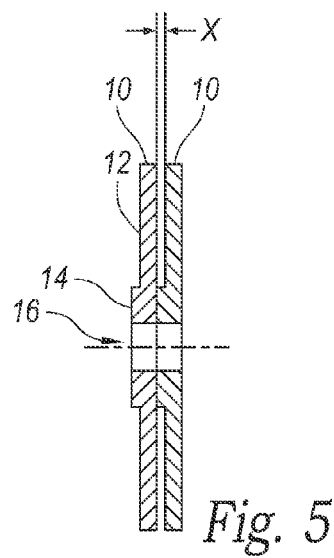
FIG. 5 is a cross-section of a pair of representative discs.
Figure 6:
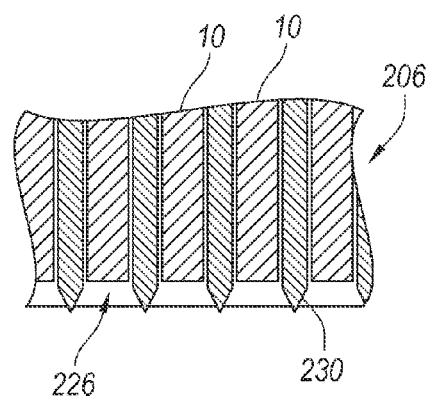
FIG. 6 is a partial cross-section of an alternative embodiment of the disc tray that includes a plurality of slots.

As shown in FIG. 5, discs 10 include a data portion 12, a hub 14, and an opening 16 extending through the hub 14. When a plurality of discs 10 are stacked, the data portions 12 of the discs are separated a distance X by the thickness of the discs' hubs 14. In some embodiments, a spacer disc can be positioned between the hubs 14 to increase distance X in order to facilitate extracting discs 10 from their respective disc locations. In some embodiments, the disc tray 106 includes retention members to hold each disc in a selected alignment. For example, FIG. 6 illustrates another embodiment of the disc tray 206 that includes vertically oriented slots 226 each of which can accommodate a disc 10. In this embodiment, each slot 226 has an adjacent divider wall 230 to separate discs 10 from one another. In some embodiments, discs 10 are standard digital optical discs, such as CD, DVD, Blu-ray, or other data storage discs. Accordingly, these discs have standard dimensions, such that the particular location of each disc 10 relative to its disc tray 106 is known or detectable.

Figure 7:
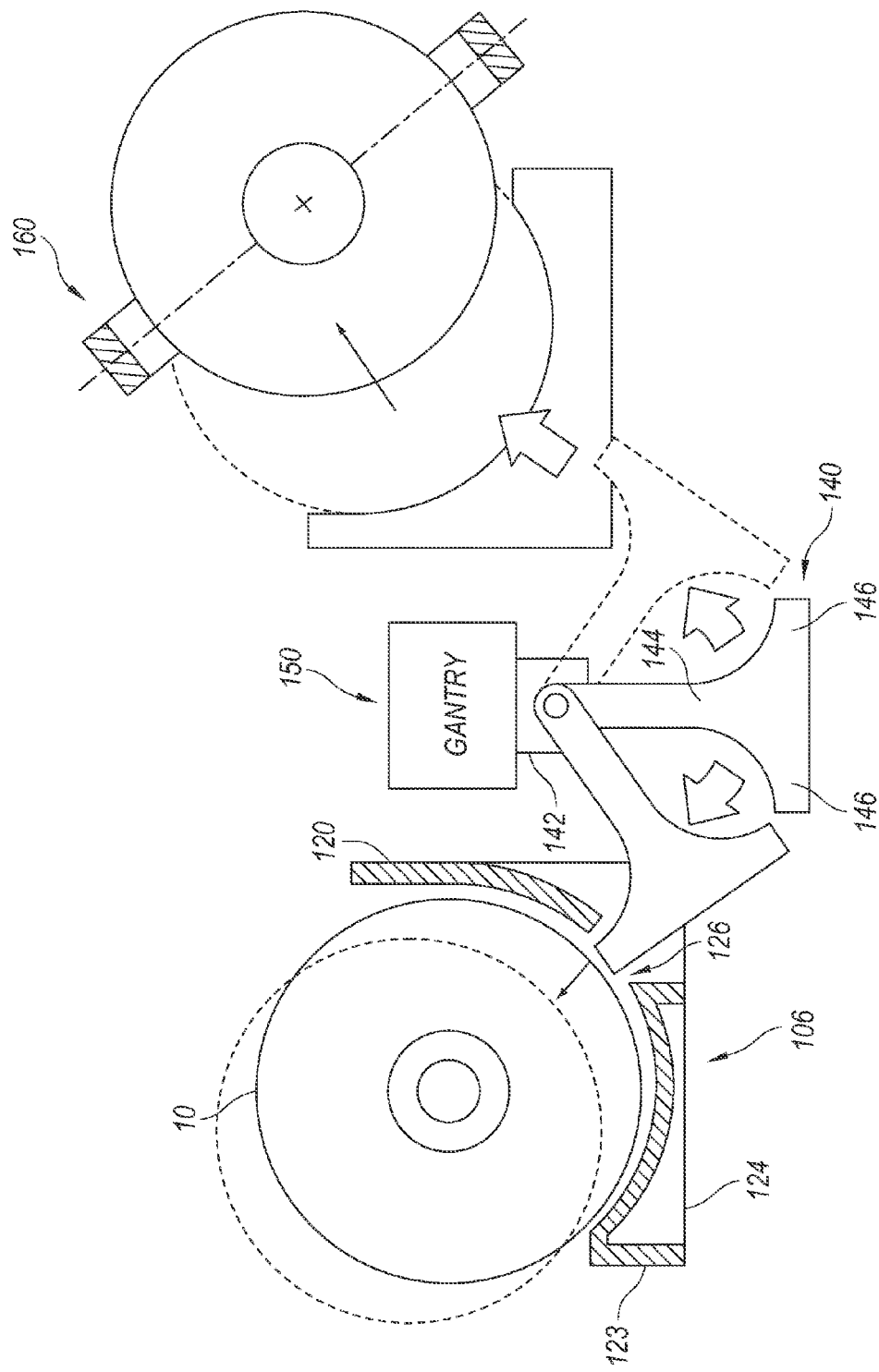
FIG. 7 is a side view in elevation illustrating a bi-directional disc pusher according to a representative embodiment.

FIG. 7 is a side view illustrating a disc pusher assembly 140 that includes an arm 144 and corresponding plungers 146 extending laterally from the arm 144. The arm 144 is actuated by a rotary actuator 142 which is in turn attached to a gantry 150. The gantry 150 is positioned between two oppositely facing disc trays 106. Accordingly, disc pusher assembly 140 can push discs 10 from the two different disc trays. When actuated, plunger 146 extends into access aperture 126 in order to push disc 10 laterally from its disc location and at least partially out of the disc tray's 106 open top and side. Returning briefly to FIG. 4, adjacent the access apertures 126 are guides 130. Each guide 130 includes chamfered edges 132 to guide the plunger 146 toward a selected target disc 10.

As can be appreciated from FIG. 7, the rotary actuator 142 is configured to pivot the disc pusher arm 144 clockwise and counterclockwise, such that the disc pusher assembly 140 is bi-directional. Thus, the disc pusher assembly 140 can push discs from both the left and the right disc trays. It should be understood that disc magazine 100 can include a suitable actuator to move gantry 150 vertically within the cabinet between the vertical drawers 104 (see FIG. 1). Gantry 150 can include a suitable actuator to move the disc pusher assembly 140 horizontally along the length of each disc tray 106. Once disc pusher assembly 140 has pushed a disc 10 from its disc tray, a robotic gripper 160 can grasp the disc and transport it to an associated disc drive.

Figure 8:
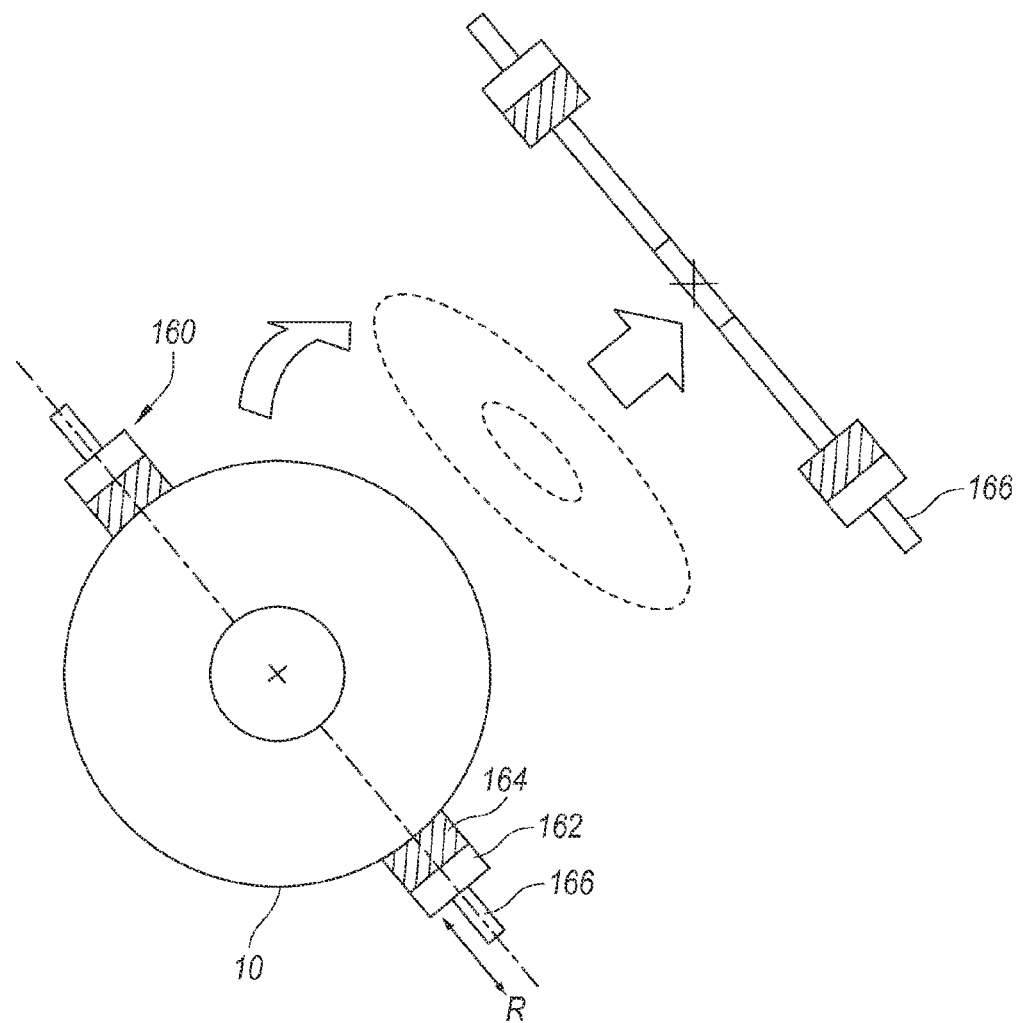
FIG. 8 is a side view of a robotic disc gripper.
Figure 9:
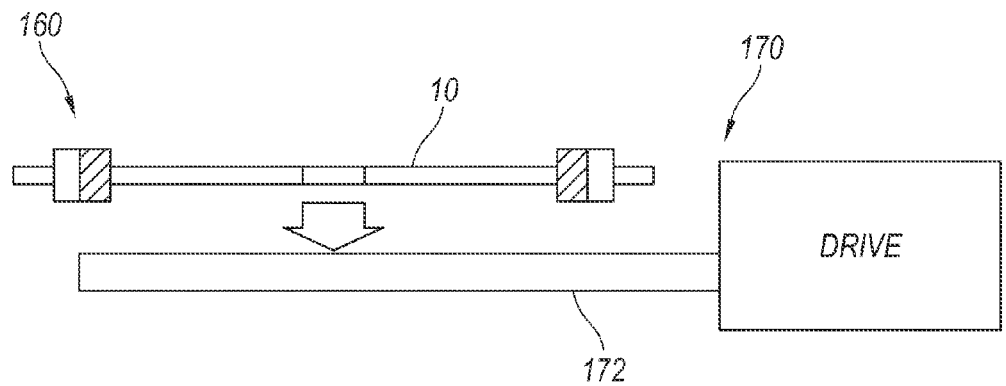
FIG. 9 is a side view of the disc gripper shown in FIG. 8 placing a disc into a horizontally oriented disc drive.
Figure 10:
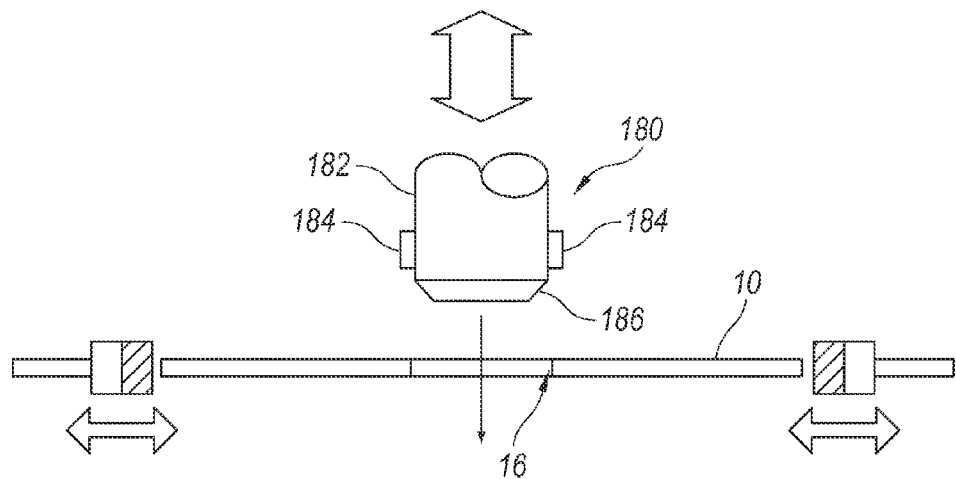
FIG. 10 is a side view in elevation illustrating a hub grip associated with the robotic disc gripper.
Figure 11:
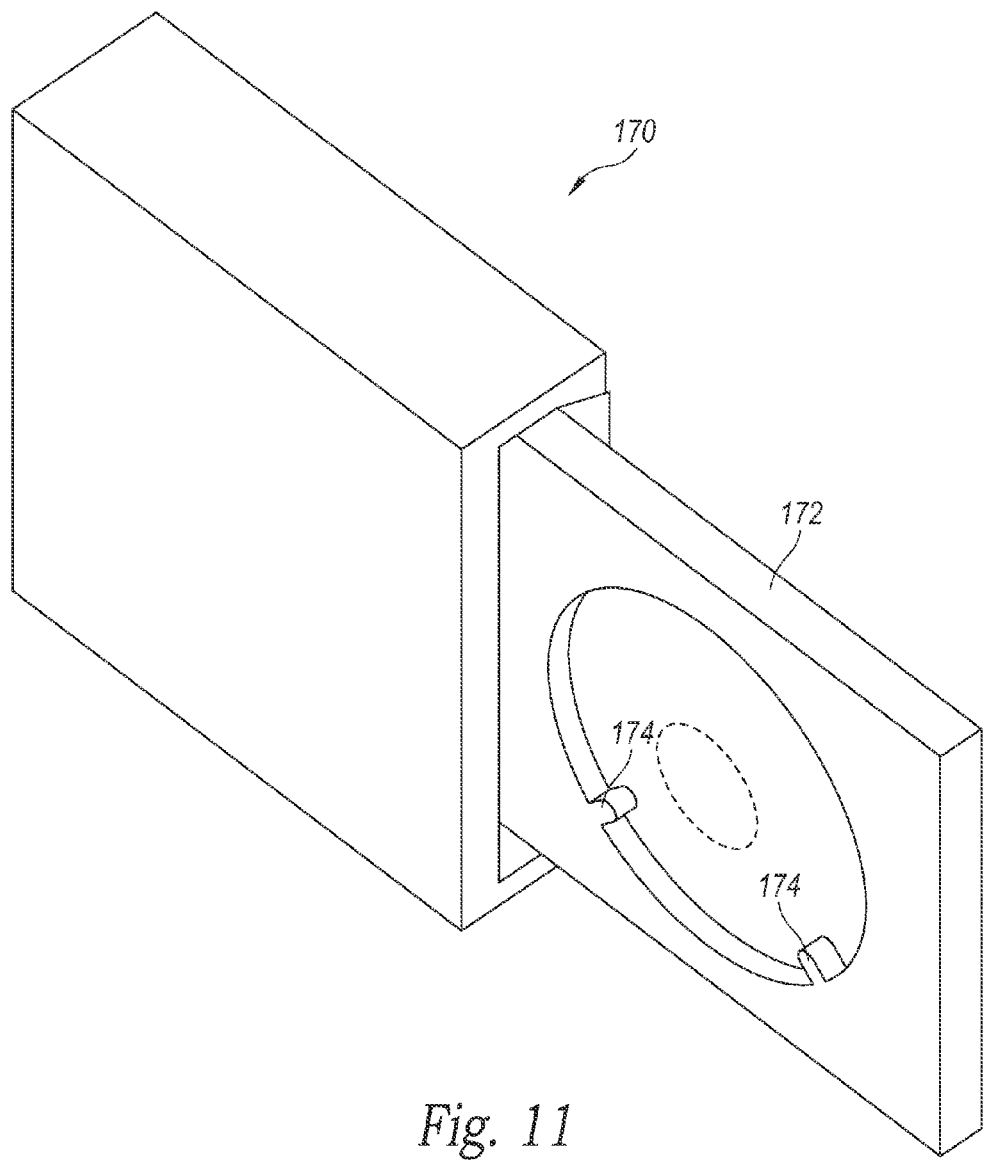
FIG. 11 is a perspective view illustrating the disc drive oriented in a vertical orientation.

Robotic disc gripper 160, as shown in FIG. 8, includes a pair of fingers 162 at least one of which actuates in a radial direction R with respect to disc 10. In some embodiments, each finger 162 includes a flexible disc engaging portion 164. For example, in some embodiments the flexible disc engaging portion 164 comprises an elastomer that is conformable to the curvature of disc 10. Disc gripper 160 is also pivotable about pivots 166 in order to move disc 10 from one position, such as a vertically oriented position relative to the disc tray 106, to a second position, such as a horizontally oriented position that allows the disc 10 to be received by a disc drive. FIG. 9 illustrates robotic disc gripper 160 placing a disc 10 on the drive tray 172 of disc drive 170. With further reference to FIG. 10, the disc gripper 160 can include a hub grip 180. Hub grip 180 facilitates picking and placing a disc 10 onto a horizontal disc drive. In some embodiments, hub grip 180 includes a cylindrical pin 182 with radially extending latches 184 and a chamfered portion 186 to facilitate insertion into the central disc opening 16. FIG. 11 illustrates disc drive 170 vertically oriented and including a pair of tabs 174 to retain a disc placed within disc tray 172. In some embodiments, robotic disc gripper 160 is carried on a portion of the gantry 150 along with disc pusher assembly 140. In other embodiments, the disc gripper 160 is carried on a separate gantry for movement relative to the disc pusher assembly 140. It should be appreciated that the disc gripper 160 is also operative to move a disc from the disc drive 170 back to its original position or to a different disc position. In some embodiments, the disc gripper 160 can include a bumper to facilitate moving the disc into the selected disc position.

Figure 12:
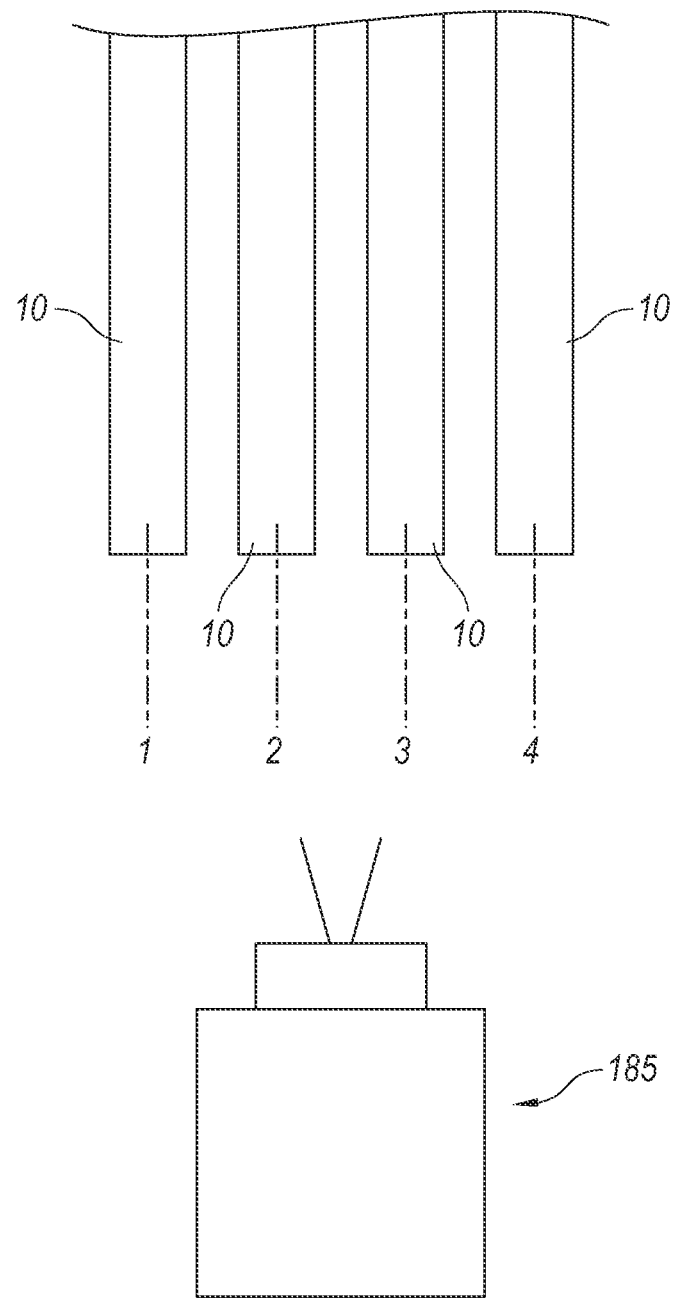
FIG. 12 is a schematic representation of a disc edge sensor for detecting discs in the disc tray.

FIG. 12 illustrates a disc sensor 185 which is operative to detect the edges of a plurality of discs 10 or access apertures 126, 226 (FIGS. 4 and 6). Accordingly, disc sensor 185 can facilitate locating a target disc location. In some embodiments, the disc sensor 185, in conjunction with the datum flag 118 (see FIG. 2), can calibrate, confirm, and/or zero the position of the disc pusher assembly 140 and robotic gripper 160 with respect to the disc tray 106. In some embodiments, the disc sensor 185 is mounted on gantry 150. Disc sensor 185 can be a machine vision camera, a laser, or other suitable detection device. The disc magazine 100 may include a suitable controller or computer to operate and coordinate the gantry 150, disc pusher assembly 140, disc gripper 160, disc sensor 185, and disc drive 170.

Figure 13:
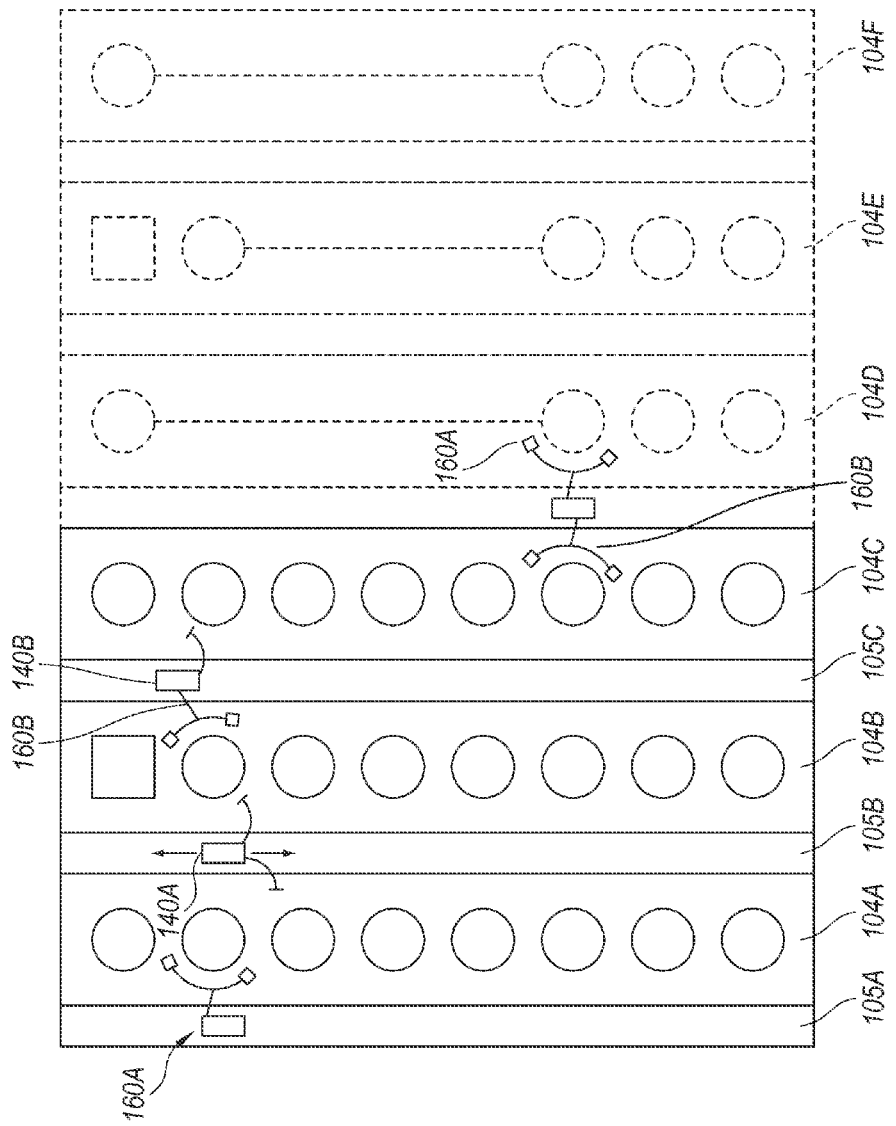
FIG. 13 is a schematic representation of a disc magazine according to another representative embodiment.

FIG. 13 schematically represents an embodiment of the disc magazine 300 illustrating that multiples of the vertical drawers 104 can be combined depending on the size and number of the cabinets used. For example, in this embodiment the cabinet can include three or six vertical drawers. Drawers 104A, 104B, and 104C are combined into a cabinet. Each drawer has a corresponding interstitial space 105A, 105B, and 105C. These interstitial spaces accommodate the gantries 150 associated with disc pusher assemblies 140 and disc grippers 160. For example, space 105B includes a bi-directional disc pusher assembly 140A that can push discs from disc trays located in both drawer 104A and 104B. Space 105A includes a disc gripper 160A to grasp discs pushed from disc trays 104A by disc pusher assembly 140A. Similarly, space 105C includes disc gripper 160B to grasp discs pushed from drawer 104B. Space 105C also includes a uni-directional disc pusher assembly 140B which is operative to push discs from drawer 104C into a disc gripper 160. Any suitable arrangement of pushers and/or grippers can be used. For example, a double gripper arrangement 160A, 160B can be positioned between adjacent drawers 104C and 104D. In other embodiments, a single uni-directional disc pusher 140B can be used. It can be appreciated that various multiples of drawers and interstitial spaces can be combined depending on the space available and to accommodate various drive configurations, whether they be vertically or horizontally oriented. For example, additional drawers 104D, 104E and 104F can be combined with the other drawers. Thus, the disclosed disc magazine is scalable to storage needs and available space.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. An optical disc magazine, comprising:
   a cabinet;
   one or more drawers in the cabinet;
   at least one disc tray in the one or more drawers;
   a gantry;
   a disc pusher supported on the gantry within the cabinet and positionable relative to the disc tray adjacent a selected target disc location; and
   a gripper positionable adjacent the target disc location and operative to grip a disc pushed from the target disc location by the disc pusher;
   wherein the gripper includes two or more fingers at least one of which actuates in a radial direction with respect to a disc located at least partially within the at least one disc tray, and wherein selected ones of the two or more fingers comprise a flexible disc engaging portion.

2. The disc magazine of claim 1, wherein the at least one disc tray includes a plurality of slots each configured to receive a disc therein.

3. The disc magazine of claim 2, wherein the tray includes a plurality of openings each corresponding to one of the plurality of slots and positioned to receive the disc pusher.

4. The disc magazine of claim 1, wherein the gripper includes a hub grip positioned to engage a central opening of a disc.

5. The disc magazine of claim 1, comprising two or more drawers and wherein the disc pusher is bi-directional and located between adjacent drawers.

6. The disc magazine of claim 5, further comprising a first actuator operative to move the disc pusher in a first direction, and a second actuator operative to move the disc pusher in a second direction substantially orthogonal to the first direction.

7. The disc magazine of claim 1, further comprising a disc drive positioned within the cabinet to receive a disc from the gripper.

8. A disc magazine, comprising:
   a cabinet;
   at least one disc drive coupled to the cabinet;
   a plurality of drawers in the cabinet;
   a plurality of disc trays in at least one of the plurality of drawers, wherein each disc tray includes a plurality of disc locations;
   a gantry;
   a bi-directional disc pusher supported on the gantry between adjacent drawers and positionable along the adjacent drawers proximate a selected target disc location corresponding to one of the plurality of disc locations; and
   a robotic gripper positionable adjacent the target disc location and operative to grip a disc pushed at least partially from the target disc location by the disc pusher and to transport the disc to the disc drive;
   wherein the gripper includes two or more fingers at least one of which actuates in a radial direction with respect to a disc located within the at least one disc tray, and wherein selected ones of the two or more fingers comprise a flexible disc engaging portion.

9. The disc magazine of claim 8, wherein each disc location is a vertically oriented slot including a corresponding opening in the at least one disc tray positioned to receive the disc pusher.

10. The disc magazine of claim 8, wherein the gripper includes a hub grip positioned to engage a central opening of a disc.

11. The disc magazine of claim 8, further comprising a disc sensor mounted on the gantry and operative to identify the target disc location.

12. The disc magazine of claim 8, wherein the gripper includes one or more pivots whereby the gripper can move a disc between first and second angular orientations.

13. A disc magazine, comprising:
    a cabinet;
    at least one disc drive coupled to the cabinet;
    a plurality of drawers in the cabinet;
    a plurality of disc trays in at least one of the plurality of drawers, wherein each disc tray includes a plurality of disc locations;
    a gantry;
    a bi-directional disc pusher supported on the gantry between adjacent drawers and positionable along the adjacent drawers proximate a selected target disc location corresponding to one of the plurality of disc locations; and
    a robotic gripper positionable adjacent the target disc location and operative to grip a disc pushed at least partially from the target disc location by the disc pusher and transport the disc to the disc drive, wherein the gripper includes one or more pivots whereby the gripper can move the disc between first and second angular orientations and a hub grip positioned to engage a central opening of a disc.

14. The disc magazine of claim 13, further comprising a disc sensor mounted on the gantry and operative to identify the target disc location.

15. The disc magazine of claim 14, wherein the disc sensor is a camera.

16. An optical disc magazine, comprising:

a cabinet;

one or more drawers in the cabinet;

at least one disc tray in the one or more drawers;

a gantry;

a disc pusher supported on the gantry within the cabinet and positionable relative to the disc tray adjacent a selected target disc location; and a gripper positionable adjacent the target disc location and operative to grip a disc pushed from the target disc location by the disc pusher;

wherein the gripper includes two or more fingers at least one of which actuates in a radial direction with respect to a disc located at least partially within the at least one disc tray, and wherein the gripper includes a hub grip positioned to engage a central opening of a disc.

17. An optical disc magazine, comprising:

a cabinet;

two or more drawers in the cabinet;

at least one disc tray in the one or more drawers;

a gantry;

a bi-directional disc pusher supported on the gantry within the cabinet between adjacent drawers and positionable relative to the disc tray adjacent a selected target disc location;

a first actuator operative to move the disc pusher in a first direction, and a second actuator operative to move the disc pusher in a second direction substantially orthogonal to the first direction; and a gripper positionable adjacent the target disc location and operative to grip a disc pushed from the target disc location by the disc pusher.

18. A disc magazine, comprising:

a cabinet;

at least one disc drive coupled to the cabinet;

a plurality of drawers in the cabinet;

a plurality of disc trays in at least one of the plurality of drawers, wherein each disc tray includes a plurality of disc locations;

a gantry;

a bi-directional disc pusher supported on the gantry between adjacent drawers and positionable along the adjacent drawers proximate a selected target disc location corresponding to one of the plurality of disc locations; and a robotic gripper positionable adjacent the target disc location and operative to grip a disc pushed at least partially from the target disc location by the disc pusher and to transport the disc to the disc drive;

wherein the gripper includes two or more fingers at least one of which actuates in a radial direction with respect to a disc located within the at least one disc tray, and wherein the gripper includes a hub grip positioned to engage a central opening of a disc.

\* \* \* \* \*